(12) United States Patent
Tsuchiya et al.

(10) Patent No.: US 8,497,044 B2
(45) Date of Patent: Jul. 30, 2013

(54) SOLID OXIDE FUEL CELL DEVICE

(75) Inventors: Katsuhisa Tsuchiya, Kitakyushu (JP);
Toshiharu Otsuka, Kitakyushu (JP);
Tsukasa Shigezumi, Kitakyushu (JP);
Toshiharu Ooe, Kitakyushu (JP);
Kiyotaka Nakano, Kitakyushu (JP);
Yoshiyuki Kawamura, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 494 days.

(21) Appl. No.: 12/788,923

(22) Filed: May 27, 2010

(65) Prior Publication Data

US 2010/0304245 A1     Dec. 2, 2010

(30) Foreign Application Priority Data

May 28, 2009   (JP) ................................. 2009-129053
May 19, 2010   (JP) ................................. 2010-114970

(51) Int. Cl.
  *H01M 8/04* (2006.01)
  *H01M 8/06* (2006.01)
(52) U.S. Cl.
  USPC .......................................... 429/429; 429/423
(58) Field of Classification Search
  USPC ................................................. 429/423, 429
  See application file for complete search history.

(56) References Cited

U.S. PATENT DOCUMENTS

2004/0038095 A1*   2/2004   Kushibiki et al. ............... 429/20

FOREIGN PATENT DOCUMENTS

| JP | 2004-319420 A | 11/2004 |
|---|---|---|
| JP | 2005-293951 A | 10/2005 |
| JP | 2007-103194 A | 4/2007 |

OTHER PUBLICATIONS

Extended European Search Report for European Application No. 10164136.3, dated Mar. 11, 2011, 4 pages.

* cited by examiner

*Primary Examiner* — Patrick Ryan
*Assistant Examiner* — Muhammad Siddiquee
(74) *Attorney, Agent, or Firm* — Brinks Hofer Gilson & Lione

(57) ABSTRACT

To provide a solid oxide fuel cell device capable of stably increasing the temperature of a fuel cell units and smoothly starting electrical generation. The present invention is a solid oxide fuel cell device (1), having a fuel cell module (2); a reformer (20); a fuel supply means (38); a reforming oxidant gas supply means (44); a water supply means (28); a generating oxidant gas supply means (45); and a control section (110) for causing reforming reactions to occur in the reformer at the temperature at which electricity can be generated, prior to the start of electrical generation, in the sequence: POX, in which only the partial oxidation reaction occurs, ATR, in which the partial oxidation reaction and the steam reforming reactions occur, and SR, in which only steam reforming reaction occurs; whereby the control section controls the fuel supply means so that the rate of change in the fuel supply flow rate versus time at the time of transition from the ATR to the SR is the smallest of the rates of change when the fuel supply flow rate is changed at the temperature at which electricity can be generated.

7 Claims, 12 Drawing Sheets

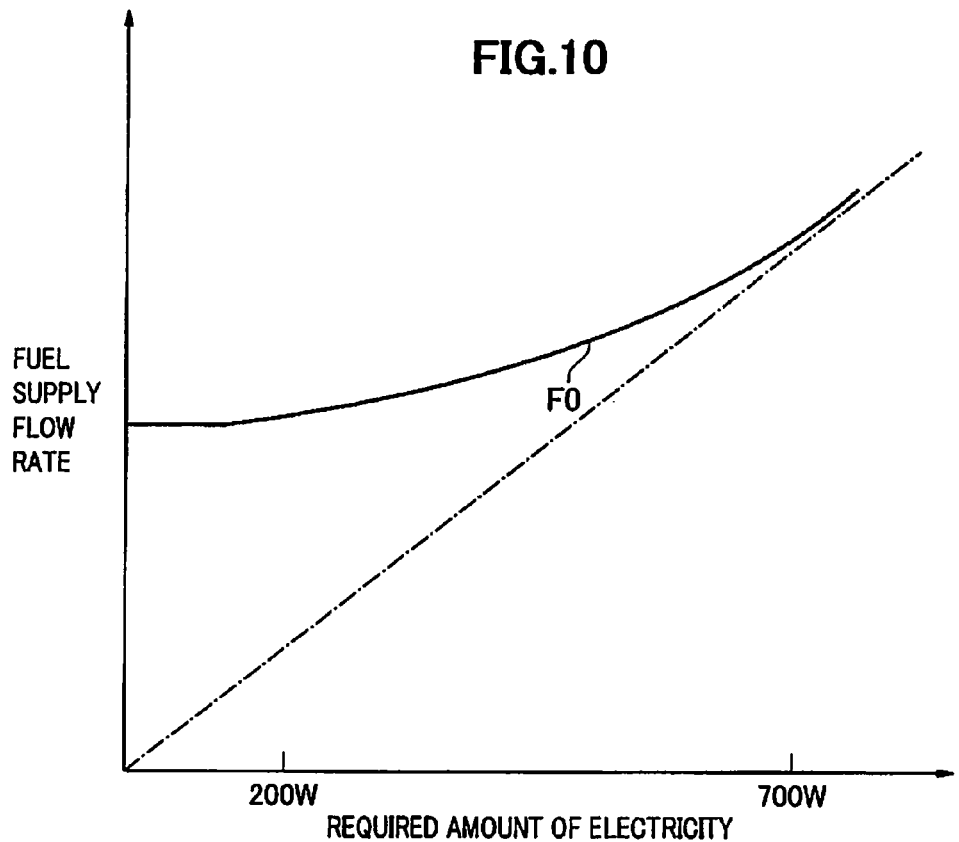
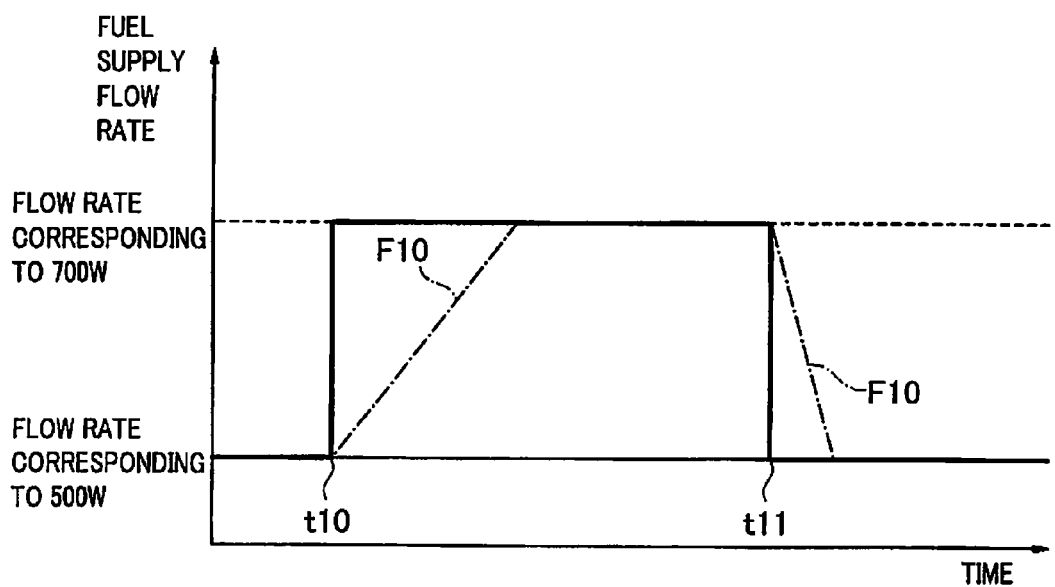

FIG.12

| REQUIRED AMOUNT OF ELECTRICITY | FUEL SUPPLY FLOW RATE L/min | GENERATING AIR SUPPLY FLOW RATE L/min | WATER FLOW RATE cc/min | FUEL UTILIZATION RATIO % | AIR UTILIZATION RATIO % |
|---|---|---|---|---|---|
| 700W | 2.8 | 60 | 6.0 | 68 | 35 |
| 600W | 2.6 | 50 | 5.8 | 62 | 35 |
| 500W | 2.3 | 42 | 5.5 | 58 | 34 |
| 400W | 1.9 | 35 | 4.5 | 55 | 34 |
| 300W | 1.7 | 30 | 4.0 | 47 | 29 |
| 200W | 1.5 | 26 | 3.5 | 35 | 22 |

FIG.13

| MODE | STATE | FUEL SUPPLY FLOW RATE (L/min) | REFORMING AIR SUPPLY FLOW RATE (L/min) | POWER GENERATING AIR SUPPLY FLOW RATE (L/min) | WATER SUPPLY FLOW RATE (cc/min) | TEMPERATURE CONDITIONS FOR TRANSITION(°C) | | |
|---|---|---|---|---|---|---|---|---|
| | | | | | | REFORMER | STACK | EVAPORATING SECTION |
| STARTUP MODE | COMBUSTION OPERATION | 6.0 | 10.0 | 100.0 | 0.0 | 300°C OR ABOVE | – | – |
| | POX1 | 6.0 | 10.0 | 100.0 | 0.0 | 350°C OR ABOVE | – | – |
| | POX2 | 5.0 | 18.0 | 100.0 | 0.0 | 600°C OR ABOVE | 250°C OR ABOVE | – |
| | ATR1 | 5.0 | 8.0 | 100.0 | 2.0 | 600°C OR ABOVE | 400°C OR ABOVE | 100°C OR ABOVE |
| | ATR2 | 4.0 | 4.0 | 100.0 | 3.0 | 650°C OR ABOVE | 600°C OR ABOVE | 100°C OR ABOVE |
| | SR1 | 3.0 | 0.0 | 100.0 | 8.0 | 650°C OR ABOVE | 700°C OR ABOVE | 100°C OR ABOVE |
| | SR2 | 2.3 | 0.0 | 80.0 | 6.3 | 650°C OR ABOVE | 700°C OR ABOVE | 100°C OR ABOVE |

SOLID OXIDE FUEL CELL DEVICE

RELATED APPLICATIONS

This application claims priority under 35 U.S.C. §119 to Japanese Patent Application Nos. 2009-129053 filed on May 28, 2009, and 2010-114970 filed on May 19, 2010, the entire contents of which are hereby incorporated by reference.

BACKGROUND OF THE INVENTION

1. Field of the Invention

The present invention relates to a solid oxide fuel cell device, and more particularly to a solid oxide fuel cell device for generating electricity by reacting fuel with a generating oxidant gas.

2. Description of the Related Art

Solid oxide fuel cells ("SOFCs" below) operate at relatively high temperatures, using an oxide ion-conducting solid electrolyte as an electrolyte, with electrodes placed on each side thereof, and with fuel gas supplied to one side thereof and an oxidant (air, oxygen, or the like) supplied to the other side thereof.

In such SOFCs, steam or carbon dioxide is produced by the reaction between oxygen ions passed through the oxide ion-conducting solid electrolyte and fuel, thereby generating electrical and thermal energy. The electrical energy is removed to outside the SOFC, where it is used for various electrical purposes. The thermal energy is transferred to the fuel, the SOFCo, the oxidant, and the like, and is used to raise the temperature thereof.

Japanese Patent Unexamined Publication No. 2007-103194 (JP2007-103194A) sets forth a power supply furnished with a solid oxide fuel cell device. In the fuel cell device set forth therein, fuel and air are combusted in a combustion chamber after contributing to the generation of electricity, and that heat of combustion is used to heat a cell stack.

Japanese Patent Unexamined Publication No. 2005-293951 (JP2005-293951A) sets forth a fuel cell device and a method for operating same. This fuel cell device is furnished with a first supply means for supplying hydrogen-rich fuel gas by steam reforming, and a second supply means for supplying hydrogen-rich fuel gas by partial oxidation of a raw material gas for fuel. During electrical generation, a large volume of fuel gas necessary for electrical generation is supplied using the first supply means, and when electrical generation is being started and stopped, fuel gas is supplied by partial oxide reforming using the second supply means.

SUMMARY OF THE INVENTION

However, the problem occurs that in fuel cell units used by combining partial oxidation reforming and steam reforming, such as that set forth in JP2005-293951A, the partial oxidation reaction is an exothermic reaction, and the steam reforming reaction is an endothermic reaction, therefore when a switch-off is made between these, thermal balance in the entirety of the fuel cell unit is lost, and operation becomes unstable. In particular, the problem occurs that when switching from the partial oxidation reaction to the steam reforming reaction at the time of startup, the reaction changes from an exothermic reaction to an endothermic reaction, resulting in a tendency for the fuel cell unit temperature to suddenly drop. Once the fuel cell unit temperature drops, a very long period of time is required to recover the original temperature, and the period from startup of the fuel cell device until the startup of electrical generation is long.

Therefore the present invention has the object of providing a solid oxide fuel cell device with which temperature of solid oxide fuel cell units can be stably increased during the startup state, and electrical generation can be smoothly started.

In order to resolve the above-described problems, the present invention is a solid oxide fuel cell device for generating electricity by reacting fuel with a generating oxidant gas, comprising: a fuel cell module furnished with multiple solid oxide fuel cell units; a reformer for supplying reformed fuel to the solid oxide fuel cell units; a fuel supply device for supplying fuel to be reformed by the reformer, a reforming oxidant gas supply device for supplying reforming oxidant gas to the reformer; a water supply device for supplying water to the reformer; a generating oxidant gas supply device for supplying generating oxidant gas to the solid oxide fuel cell units; and a controller for controlling the fuel supply device, the reforming oxidant gas supply device, and the water supply device in a startup operation prior to the start of electrical generation by the fuel cell module, raising the solid oxide fuel cell units to a temperature at which electrical generation is possible, while reducing the fuel supply flow rate in a stepwise manner in each operation, so that reforming reactions are induced in the reformer in the sequence of a POX operation, in which only a partial oxidation reaction occurs, an ATR operation, in which a partial oxidation reaction and a steam reforming reaction occur, and an SR operation, in which only a steam reforming reaction occurs, then starting electrical generation; wherein the controller controls the fuel supply device so that the rate of change in the fuel supply flow rate versus time when transitioning from the ATR operation to the SR operation is the smallest of the rates of change when the fuel supply flow rate is changed in the startup operation.

In the present invention thus constituted, the controller controls the fuel supply device, the reforming oxidant gas supply device, the water supply device, and the generating oxidant gas supply device to supply fuel, reforming oxidant gas, and water to the reformer and to supply generating oxidant gas to the solid oxide fuel cell units. The controller also causes the reforming reactions to occur in the reformer in the sequence POX, in which only the partial oxidation reaction occurs, ATR, in which the partial oxidation reaction and the steam reforming reactions occur, and SR, in which only steam reforming reaction occurs, raising the solid oxide fuel cell unit to the temperature at which electricity can be generated. The controller here controls the fuel supply device so that the rate of change in the fuel supply flow rate versus time when transitioning from ATR to SR is the smallest of the rates of change when changing the fuel supply flow rate in the startup operation.

In the present invention thus constituted, the rate of change in the fuel supply flow rate is made to be smallest when transitioning from the ATR to the SR, therefore sudden temperature drops can be prevented from occurring when transitioning to the SR, in which only an endothermic reaction occurs. In other words, the partial oxidation reaction is an exothermic reaction, and in the POX operation the reformer is heated by the heat of reaction and the heat of combustion arising from combustion of fuel using a generating oxidant gas. In the ATR operation, an exothermic partial oxidation reaction and an endothermic steam reforming reaction occur simultaneously, and reactions inside the reformer are thermally in essentially an equilibrium state. Next, when transitioning from the ATR operation to the SR operation, the partial oxidation reaction gradually ceases to be implemented, and transition into the exothermic steam reforming reaction proceeds, therefore the reformer is heated by the heat of fuel combustion only. Hence, if the fuel supply flow rate is suddenly reduced when transitioning from the ATR operation to the SR operation, the balance between heat absorption and heat emission in the reformer is degraded, leading to the risk of inducing a reduction in the temperature of the fuel cell module. The problem arises that once the fuel cell module temperature begins to decline, a long period of time is required to restore that temperature, and startup of electrical generation is delayed. In the present invention, the rate of change in the fuel supply flow rate when transitioning from the ATR to the SR is made extremely gradual, so that the transition to the SR operation occurs while utilizing the accumulated heat in the fuel cell module as a whole; drops in the temperature of the solid oxide fuel cell unit in the startup state can thereby be reliably prevented, and a smooth startup of electrical generation can be achieved. The rate of change in the fuel supply flow rate at the temperature at which electricity can be generated is set to be smallest when transitioning from the ATR to the SR, and larger when changing other fuel supply flow rates, therefore the time required from startup until the start of electrical generation can be shortened, and sudden temperature drops are prevented.

In the present invention the controller is preferably constituted to change the reforming oxidant gas supply flow rate and the water supply flow rate in a stepwise manner during the startup operation, and to control the reforming oxidant gas supply device and the water supply device so that the rate of change in the reforming oxidant gas supply flow rate versus time when transitioning from the ATR operation to the SR operation is the smallest of the rates of change when changing the reforming oxidant gas supply flow rate in the startup operation, and the rate of change in the water supply flow rate versus time when transitioning from the ATR operation to the SR operation is the smallest of the rates of change when changing the water supply flow rate in the startup operation.

In the present invention thus constituted, the reforming oxidant gas supply flow rate of change and the water supply flow rate of change are made the smallest, therefore sudden changes in reformer reactions during transitions from the ATR operation to the SR operation are prevented. In other words, the change in reforming oxidant gas supply flow rate and water supply flow rate is extremely gradual when transitioning from the ATR operation to the SR operation, therefore the occurrence in the reformer of temperature drops caused by a sudden cessation of exothermic reactions or a sudden occurrence of endothermic reactions can be prevented. Temperature drops in the solid oxide fuel cell unit can thus be reliably prevented, and electrical generation can be smoothly started.

In the present invention the controller preferably controls the fuel supply device so that the rate of change in the fuel supply flow rate versus time when transitioning from the ATR operation to the SR operation is larger at the ending period of the transition than at the beginning period of the transition.

In the present invention thus constituted, sudden temperature changes are prevented by reducing the rate of change at the beginning of the transition from the ATR operation to the SR operation, and the transition interval from the ATR operation to the SR operation is can be shortened by increasing the rate of change at the end of transition.

In the present invention the controller preferably controls the reforming oxidant gas supply device so that during the transition from the ATR operation to the SR operation in which supply of the reforming oxidant gas is stopped, the rate of change of the reforming oxidant gas supply flow rate versus time is greater at the ending period of the transition than at the beginning period of the transition.

In the present invention thus constituted, sudden cessation of exothermic reactions or the occurrence of temperature drops in the reformer can be prevented by decreasing the rate of change at which reforming oxidant gas is reduced at the beginning period of the transition from the ATR operation to the SR operation, and the transition interval from the ATR operation to the SR operation can be shortened by increasing the rate of change at the end of transition.

In the present invention the controller preferably controls the water supply device so that a sufficient quantity of water to reform all remaining fuel by a steam reforming reaction, without reforming by a partial oxidation reaction, is constantly supplied during the transition from the ATR operation to the SR operation.

In the present invention thus constituted, it may occur that the amount of fuel reformed by the partial oxidation reaction of the fuel supplied to the reformer diminishes due to a decline in reforming oxidant gas, leading to excess fuel and raising the risk that the carbon component of the excess fuel may be deposited. Therefore since a sufficient flow rate of water is supplied to steam reform all the excess fuel, deposition of the carbon component of the fuel inside the hot reformer causing damage to same can be prevented.

In the present invention the controller preferably controls the water supply device so that the rate of change in the water supply flow rate versus time during the transition from the ATR operation to the SR operation is greater at the beginning period of the transition than at the ending period of the transition.

In the present invention thus constituted, the rate of change at which the water supply flow rate is increased is controlled to be larger at the beginning period of the transition than at the ending period of the transition, therefore a sufficient flow rate of water can be secured at the beginning period of the transition from the ATR operation to the SR operation, so that deposition of carbon inside the reformer can be prevented, and temperature drops in the reformer and the solid oxide fuel cell units due to excessive steam at the ending period of the transition can also be prevented.

The present invention is a solid oxide fuel cell device for generating electricity by reacting fuel with a generating oxidant gas, comprising: a fuel cell module furnished with multiple solid oxide fuel cell units; a reformer for supplying reformed fuel to the solid oxide fuel cell units; fuel supply means for supplying fuel to be reformed by the reformer, reforming oxidant gas supply means for supplying reforming oxidant gas to the reformer; water supply means for supplying water to the reformer; generating oxidant gas supply means for supplying generating oxidant gas to the solid oxide fuel cell units; and control means for controlling the fuel supply means, the reforming oxidant gas supply means, and the water supply means in a startup operation prior to the start of electrical generation by the fuel cell module, raising the solid oxide fuel cell units to a temperature at which electrical generation is possible, while reducing the fuel supply flow rate in a step-wise manner in each operation, so that reforming reactions are induced in the reformer in the sequence of a POX operation, in which only a partial oxidation reaction occurs, an ATR operation, in which a partial oxidation reaction and a steam reforming reaction occur, and an SR operation, in which only a steam reforming reaction occurs, then starting electrical generation; wherein the control means controls the fuel supply means so that the rate of change in the fuel supply flow rate versus time when transitioning from the ATR operation to the SR operation is the smallest of the rates of change when the fuel supply flow rate is changed in the startup operation.

In the solid oxide fuel cell device of the present invention, a smooth transition can be achieved from the startup state to the electrical generation state.

BRIEF DESCRIPTION OF THE DRAWINGS

FIG. 10: A graph showing an example of the relationship between the required amount of generated electricity input to the control section and the fuel supply flow rate needed to produce the required amount of generated electricity in an embodiment of the present invention.

FIG. 11: A graph showing an example of the change over time in fuel supply flow rate relative to changes in the required amount of generated electricity in an embodiment of the present invention.

FIG. 12: A data table showing an example of the relationship between the required amount of generated electricity and the fuel supply flow rate, generating air supply flow rate, and water supply flow rate needed to produce the required amount of generated electricity.

FIG. 13: An operation table showing an example of a solid oxide fuel cell device startup procedure in an embodiment of the present invention.

DETAILED DESCRIPTION OF THE PREFERRED EMBODIMENTS

Next, referring to the attached drawings, a solid oxide fuel cell (SOFC) device according to an embodiment of the present invention will be explained.

Figure 1:
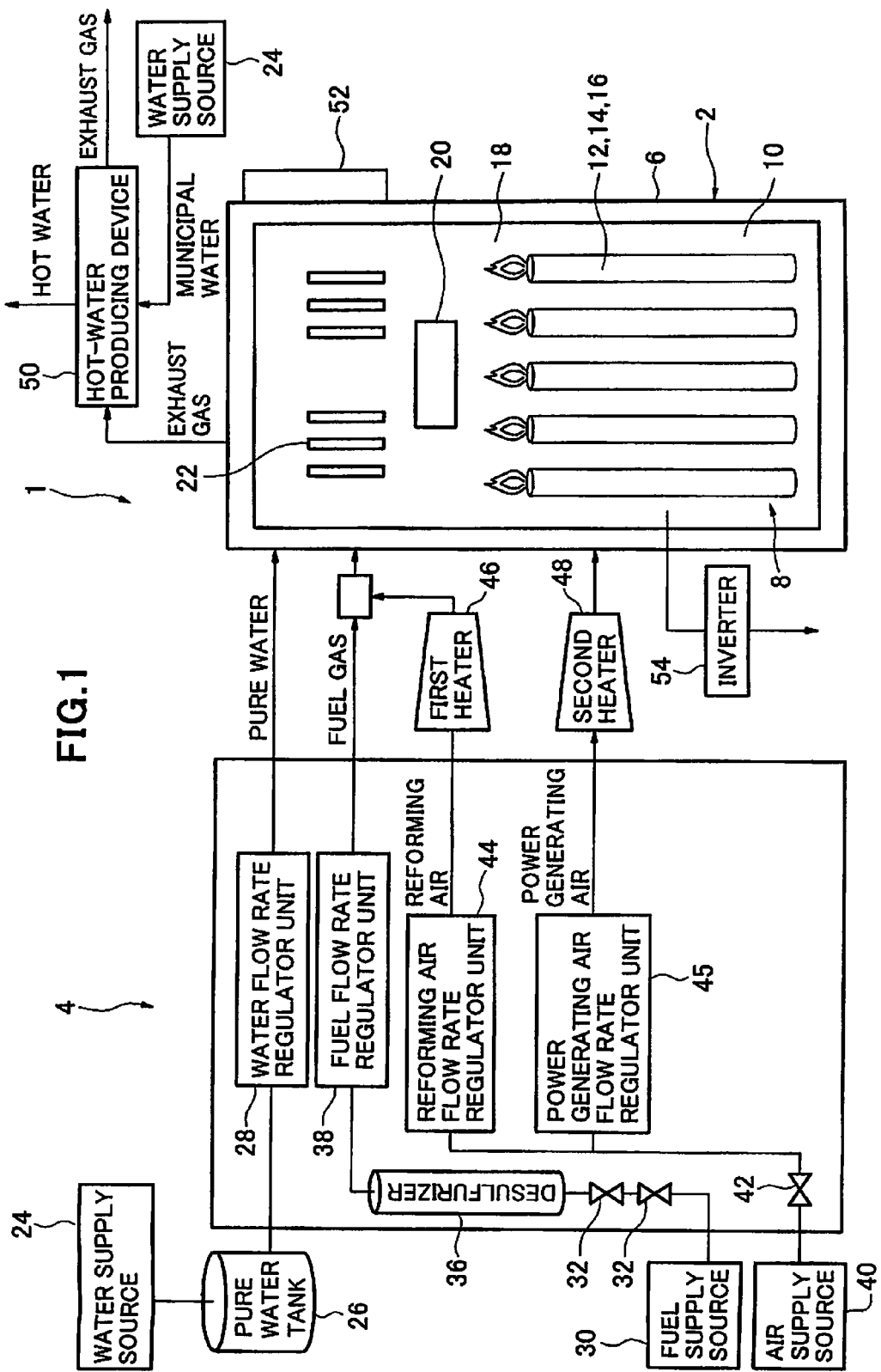
FIG. 1: An overview schematic showing a solid oxide fuel cell device (SOFC) according to an embodiment of the present invention.

As shown in FIG. 1, a solid oxide fuel cell (SOFC) device according to an embodiment of the present invention is furnished with a fuel cell module 2 and an auxiliary unit 4.

The fuel cell module 2 is furnished with a housing 6; a sealed space 8 is formed within the housing 6, mediated by insulating material (not shown, however the insulating material is not an indispensable structure and may be omitted). Note that it is acceptable to provide no insulating material. A fuel cell assembly 12 for carrying out the power generating reaction between fuel gas and oxidant (air) is disposed in the power generating chamber 10 at the lower portion of this sealed space 8. This fuel cell assembly 12 is furnished with ten fuel cell stacks 14 (see FIG. 5), and the fuel cell stack 14 comprises 16 fuel cell units 16 (see FIG. 4). Thus, the fuel cell assembly 12 has 160 fuel cell units 16, all of which are serially connected.

A combustion chamber 18 is formed above the aforementioned power generating chamber 10 in the sealed space 8 of the fuel cell module 2. Residual fuel gas and residual oxidant (air) not used in the power generation reaction is combusted in this combustion chamber 18 to produce exhaust gas.

A reformer 20 for reforming fuel gas is disposed at the top of the combustion chamber 18; the reformer 20 is heated by the heat of residual gas combustion to a temperature at which the reforming reaction can take place. An air heat exchanger 22 for receiving the heat of combustion and heating the air is further disposed above this reformer 20.

Next, the auxiliary unit 4 is furnished with a pure water tank 26 for holding water from a municipal or other water supply source 24 and filtering it into pure water, and a water flow rate regulator unit 28 (a "water pump" or the like driven by a motor) for regulating the flow rate (litter per minute) of water supplied from the reservoir tank. The auxiliary unit 4 is further furnished with a gas shutoff valve 32 for shutting off the fuel gas supply from a fuel supply source 30 such as municipal gas or the like, a desulfurizer 36 for desulfurizing the fuel gas, and a fuel gas flow rate regulator unit 38 (a "fuel pump" or the like driven by a motor) for regulating the flow rate (litter per minute) of fuel gas. Furthermore, an auxiliary unit 4 is furnished with an electromagnetic valve 42 for shutting off air serving as an oxidant and supplied from an air supply source 40, and a reforming air flow rate regulator unit 44 and generating air flow rate regulator unit 45 ("air blower" or the like driven by a motor) for regulating air flow rate (litter per minute).

Note that in the SOFC device according to the embodiment of the present invention, there is no heating means such as a heater for heating the reforming air supply to the reformer 20 or the power generating air supply to the power generating chamber 10 in order to efficiently raise the temperature at startup, nor is there a heating means for separately heating the reformer 20.

Next, a hot-water producing device 50 supplied with exhaust gas is connected to the fuel cell module 2. Municipal water from a water supply source 24 is supplied to this hot-water producing device 50; this water is turned into hot water by the heat of the exhaust gas, and is supplied to a hot water reservoir tank in an external water heater (not shown).

The fuel cell module 2 is provided with a control box 52 for controlling the supply flow rates of fuel gas and the like.

Furthermore, an inverter 54 serving as an electrical power extraction unit (electrical power conversion unit) for supplying electrical power generated by the fuel cell module to the outside is connected to the fuel cell module 2.

Figure 2:
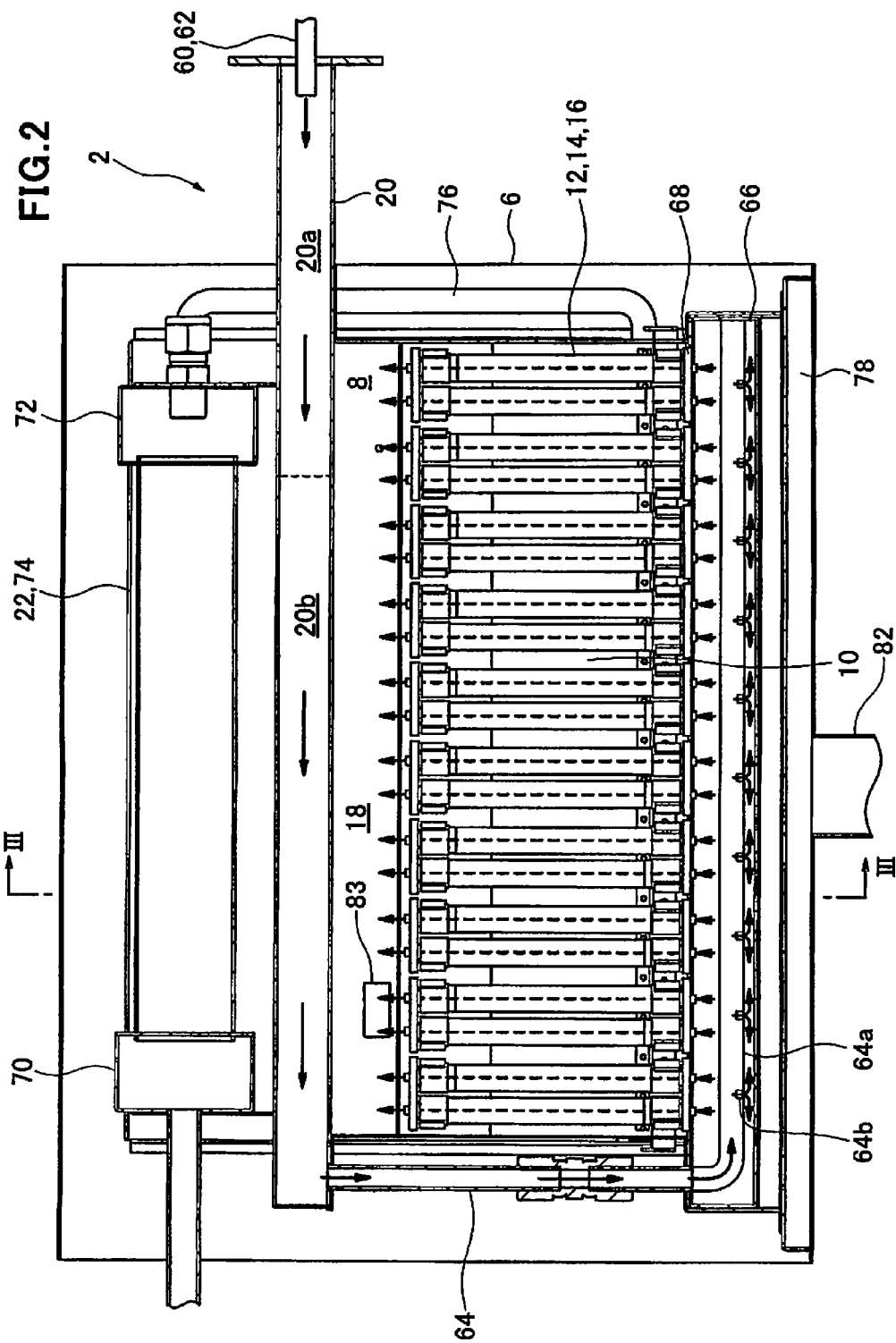
FIG. 2: A front elevation cross-section showing a solid oxide fuel cell device (SOFC) fuel cell module according to an embodiment of the present invention.
Figure 3:
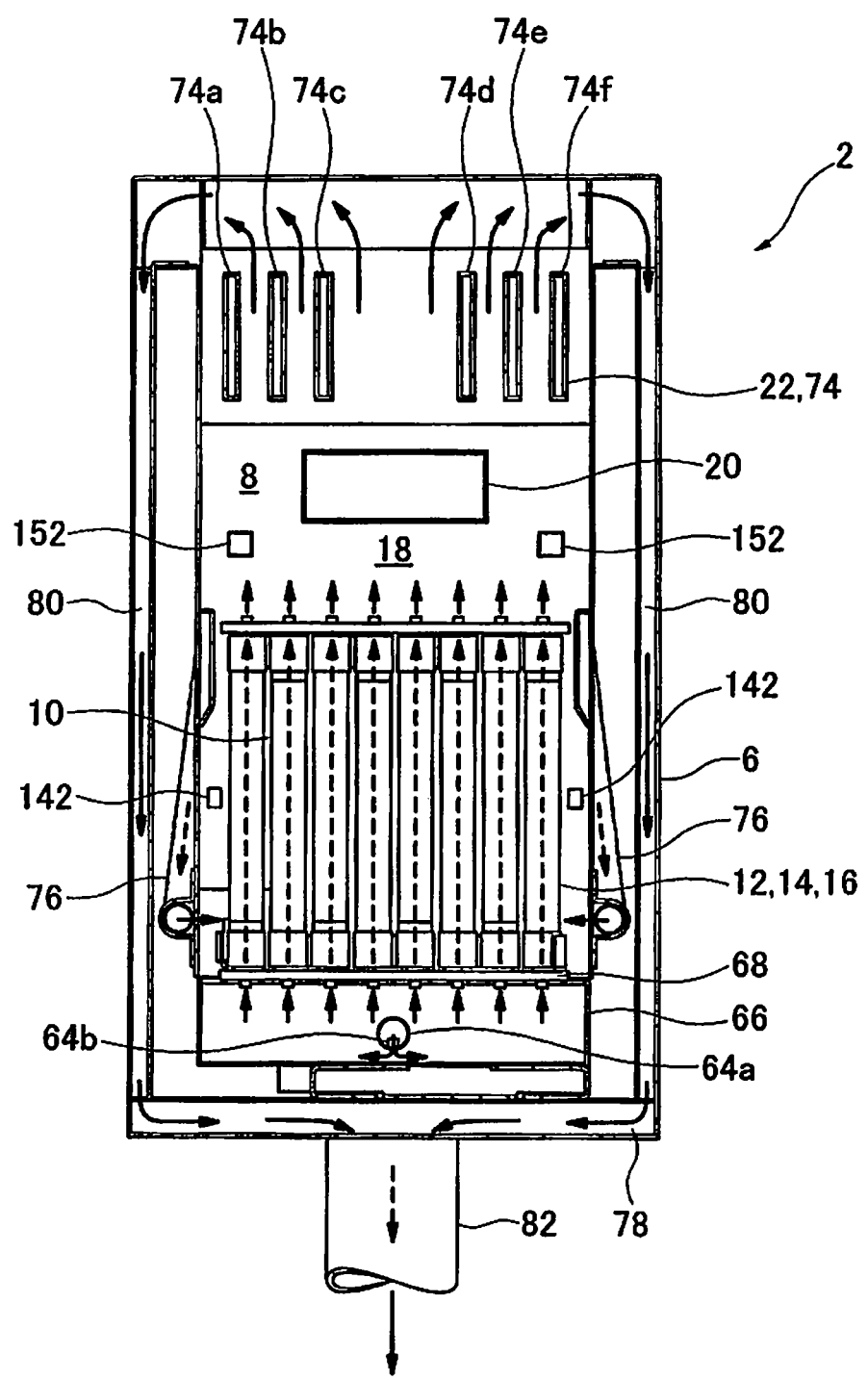
FIG. 3: A cross-section along line III-III in FIG. 2.

The internal structure of the solid oxide fuel cell (SOFC) device according to the embodiment of the present invention is explained using FIGS. 2 and 3.

As shown in FIGS. 2 and 3, a fuel cell assembly 12, a reformer 20, and an air heat exchanger 22 are arranged in sequence starting from the bottom in the sealed space 8 within the fuel cell module 2 housing 6, as described above.

A pure water guide pipe 60 for introducing pure water on the upstream end of the reformer 20, and a reform gas guide pipe 62 for introducing the fuel gas and reforming air to be reformed, are attached to the reformer 20; a vaporizing section 20a and a reforming section 20b are formed in sequence starting from the upstream side within the reformer 20, and the reforming section 20b is filled with a reforming catalyst. Fuel gas and air blended with the steam (pure water) introduced into the reformer 20 is reformed by the reforming catalyst used to fill in the reformer 20. Appropriate reforming catalysts are used, such as those in which nickel is imparted to the surface of alumina spheres, or ruthenium is imparted to alumina spheres.

A fuel gas supply line 64 is connected to the downstream end of the reformer 20; this fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64; reformed fuel gas is supplied into the manifold 66 from these fuel supply holes 64b.

A lower support plate 68 provided with through holes for supporting the above-described fuel cell stack 14 is attached at the top of the manifold 66, and fuel gas in the manifold 66 is supplied into the fuel cell unit 16.

An air heat exchanger 22 is provided over the reformer 20. The air heat exchanger 22 is furnished with an air concentration chamber 70 on the upstream side and two air distribution chambers 72 on the downstream side; the air concentration chamber 70 and the distribution chambers 72 are connected using six air flow conduits 74. Here, as shown in FIG. 3, three air flow conduits 74 form a set (74a, 74b, 74c, 74d, 74e, 74f); air in the air concentration chamber 70 flows from each set of the air flow conduits 74 to the respective air distribution chambers 72.

Air flowing in the six air flow conduits 74 of the air heat exchanger 22 is pre-heated by rising combustion exhaust gas from the combustion chamber 18.

Air guide pipes 76 are connected to each of the respective air distribution chambers 72; these air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, an exhaust gas conduit 80 extending in the vertical direction is formed on the insides of the front surface 6a and the rear surface 6b which form the faces in the longitudinal direction of the housing 6; the top inside of the exhaust gas conduit 80 communicates with the space in which the air heat exchanger to rule 22 is disposed, and the bottom end side communicates with the exhaust gas chamber 78. An exhaust gas discharge pipe 82 is connected at approximately the center of the bottom surface of the exhaust gas chamber 78; the downstream end of the exhaust gas discharge pipe 82 is connected to the above-described hot water producing device 50 shown in FIG. 1.

As shown in FIG. 2, an ignition device 83 for starting the combustion of fuel gas and air is disposed on the combustion chamber 18. No heating means such as a burner or the like for separately heating the combustion chamber 18 or the fuel cell unit 16 to support ignition at startup or prevent flameout or blow out is provided on the combustion chamber 18.

Figure 4:
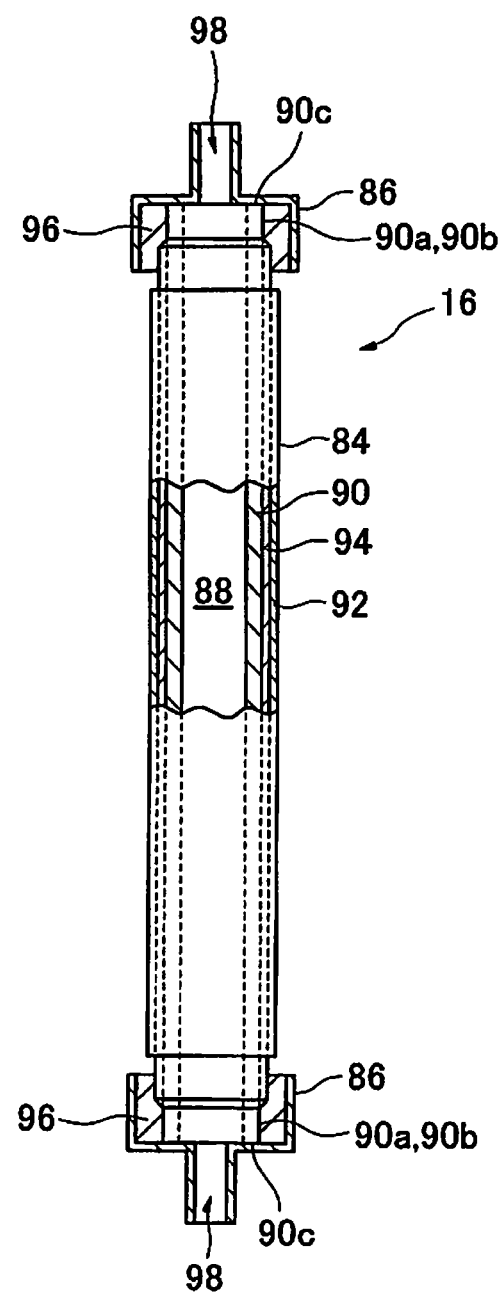
FIG. 4: A partial cross-section showing a solid oxide fuel cell device (SOFC) fuel cell unit according to an embodiment of the present invention.

Next, referring to FIG. 4, the fuel cell unit 16 will be explained. As shown in FIG. 4, the fuel cell unit 16 is furnished with a fuel cell 84 and internal electrode terminals 86, respectively connected to the respective terminals at the top and bottom of the fuel cell 84.

The fuel cell 84 is a tubular structure extending in the vertical direction, furnished with a cylindrical internal electrode layer 90, on the inside of which is formed a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and is a (−) pole, while the external electrode layer 92 is an air electrode for contacting the air, and is a (+) pole.

The internal electrode terminals 86 attached at the top and bottom ends of the fuel cell unit 16 have the same structure, therefore the internal electrode terminal 86 attached at the top end side will be specifically explained. The top portion 90a of the inside electrode layer 90 is furnished with an outside perimeter surface 90b and top end surface 90c, exposed to the electrolyte layer 94 and the outside electrode layer 92. The inside electrode terminal 86 is connected to the outer perimeter surface 90b of the inside electrode layer 90 through a conductive seal material 96, and is electrically connected to the inside electrode layer 90 by making direct contact with the top end surface 90c of the inside electrode layer 90. A fuel gas flow path 98 communicating with fuel gas flow path 88 in the inside electrode layer 90 is formed at the center portion of the inside electrode terminal 86.

The inside electrode layer 90 is formed, for example, from at least one of a mixture of Ni and zirconia doped with at least one type of rare earth element selected from among Ca, Y, Sc, or the like; or a mixture of Ni and ceria doped with at least one type of rare earth element; or any mixture of Ni with lanthanum gallate doped with at least one element selected from among Sr, Mg, Co, Fe, or Cu.

The electrolyte layer 94 is formed, for example, from at least one of the following: zirconia doped with at least one type of rare earth element selected from among Y, Sc, or the like; ceria doped with at least one type of selected rare earth element; or lanthanum gallate doped with at least one element selected from among Sr or Mg.

The outside electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; Ag, or the like.

Figure 5:
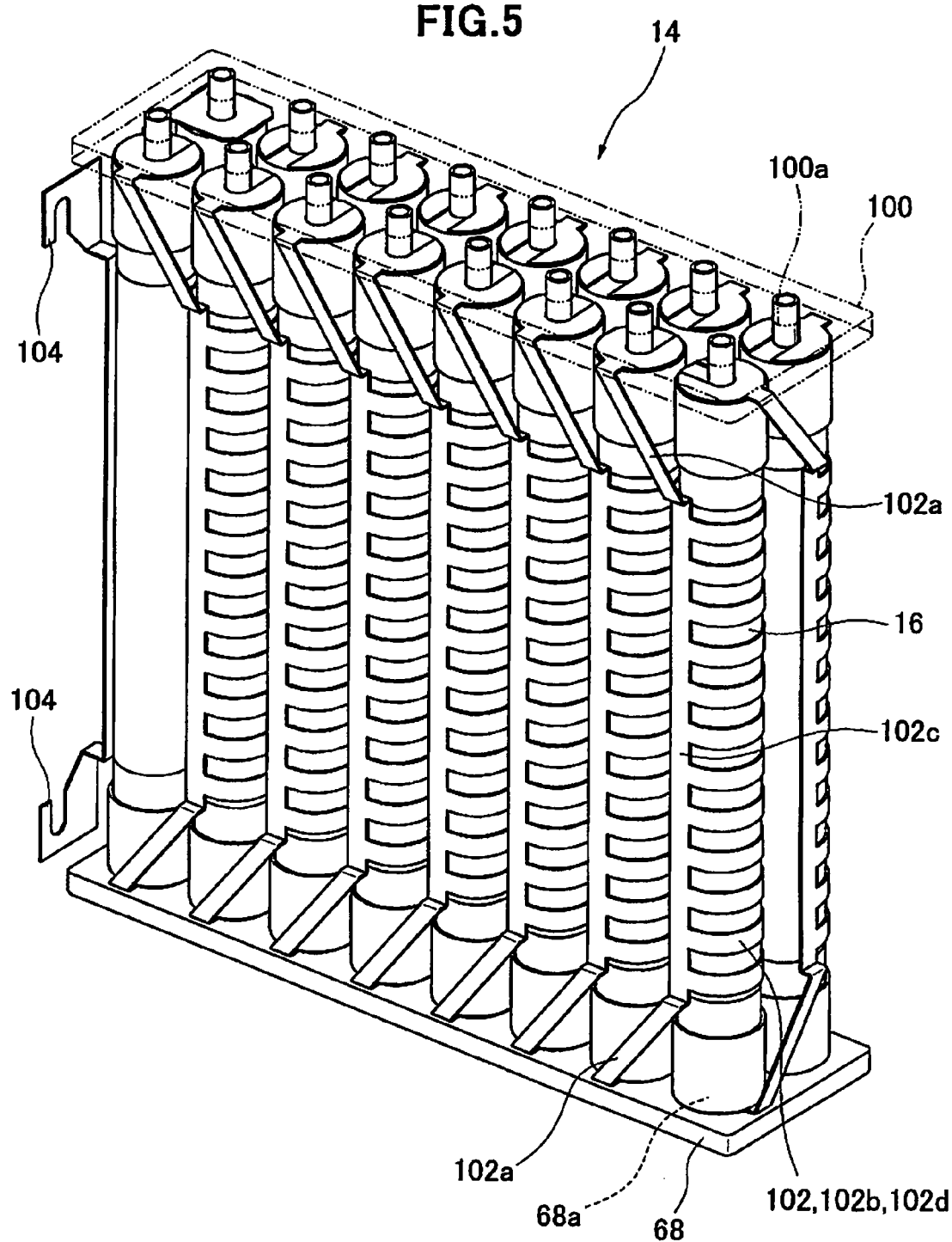
FIG. 5: A perspective diagram showing a solid oxide fuel cell device (SOFC) fuel cell stack according to an embodiment of the present invention.

Next, referring to FIG. 5, the fuel cell stack 14 will be explained. As shown in FIG. 5, the fuel cell stack 14 is furnished with sixteen fuel cell units 16; the top sides and bottom sides of these fuel cell units 16 are respectively supported by a lower support plate 68 and upper support plate 100. Through holes 68a and 100a, through which the inside electrode terminal 86 can penetrate, are provided on the lower support plate 68 and upper support plate 100.

In addition, a current collector 102 and an external terminal 104 are attached to the fuel cell unit 16. The current collector 102 is integrally formed by a fuel electrode connecting portion 102a, which is electrically connected to the inside electrode terminal 86 attached to the inside electrode layer 90 serving as the fuel electrode, and by an air electrode connecting portion 102b, which is electrically connected to the entire external perimeter of the outside electrode layer 92 serving as the air electrode. The air electrode connecting portion 102b is formed of a vertical portion 102c extending vertically along the surface of the outside electrode layer 92, and multiple horizontal portions 102d extending in the horizontal direction from the vertical portion 102c along the surface of the outside electrode layer 92. The fuel electrode connecting portion 102a extends linearly in an upward or downward diagonal direction from the vertical portion 102c of the air electrode connecting portion 102b toward the inside electrode terminals 86 positioned in the upper and lower directions on the fuel cell unit 16.

Furthermore, inside electrode terminals 86 at the top and bottom ends of the two fuel cell units 16 positioned at the end of the fuel cell stack 14 (at the front and back sides on the left edge in FIG. 5) are respectively connected to the external terminals 104. These external terminals 104 are connected to the external terminals 104 (not shown) at the ends of the adjacent fuel cell stack 14, and as described above, all of the 160 fuel cell units 16 are connected in series.

Next, referring to FIG. 6, the sensors attached to the solid oxide fuel cell (SOFC) device according to the embodiment of the present invention will be explained.

Figure 6:
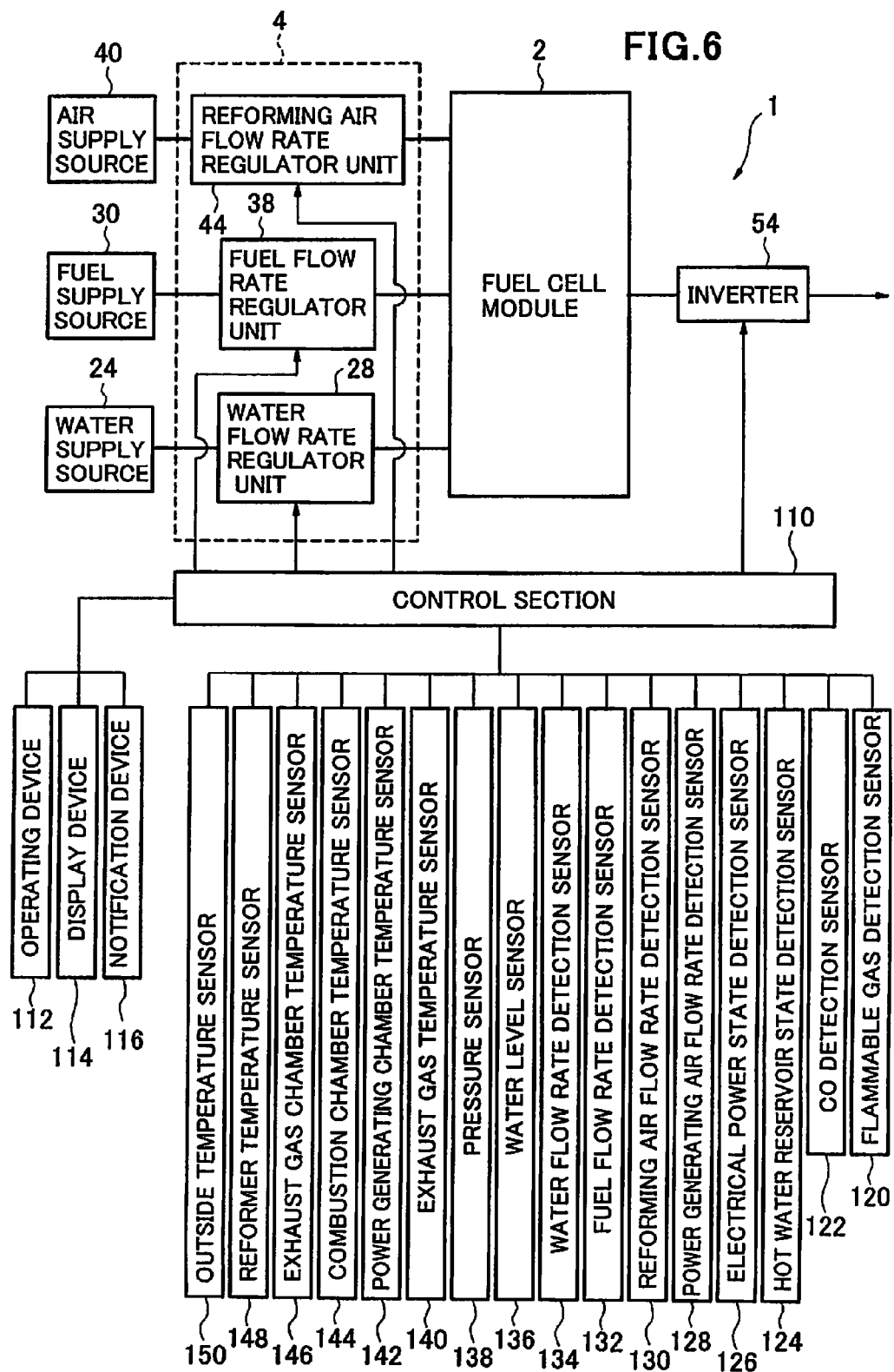
FIG. 6: A block diagram showing a solid oxide fuel cell device (SOFC) according to an embodiment of the present invention.

As shown in FIG. 6, a solid oxide fuel cell device 1 is furnished with a control unit 110, an operating device 112 provided with operating buttons such as "ON" or "OFF" for user operation, a display device 114 for displaying various data such as a generator output value (Watts), and a notification device 116 for issuing warnings during abnormal states and the like are connected to the control unit 110. The notification device 116 may be connected to a remote control center to inform the control center of abnormal states.

Next, signals from the various sensors described below are input to the control unit 110.

First, a flammable gas detection sensor 120 detects gas leaks and is attached to the fuel cell module 2 and the auxiliary unit 4.

The purpose of the flammable gas detection sensor 120 is to detect leakage of CO in the exhaust gas, which is meant to be exhausted to the outside via the exhaust gas conduit 80 and the like, into the external housing (not shown) which covers the fuel cell module 2 and the auxiliary unit 4.

A water reservoir state detection sensor 124 detects the temperature and amount of hot water in a water heater (not shown).

An electrical power state detection sensor 126 detects current, voltage, and the like in the inverter 54 and in a distribution panel (not shown).

A power generating air flow rate detection sensor 128 detects the flow rate of power generating air supplied to the generating chamber 10.

A reforming air flow rate sensor 130 detects the flow rate of reforming air supplied to the reformer 20.

A fuel flow rate sensor 132 detects the flow rate of fuel gas supplied to the reformer 20.

A water flow rate sensor 134 detects the flow rate of pure water (steam) supplied to the reformer 20.

A water level sensor 136 detects the water level in pure water tank 26.

A pressure sensor 138 detects pressure on the upstream side outside the reformer 20.

An exhaust temperature sensor 140 detects the temperature of exhaust gas flowing into the hot water producing device 50.

As shown in FIG. 3, a generating chamber temperature sensor 142 is disposed on the front surface side and rear surface side around the fuel cell assembly 12, and detects the temperature around the fuel cell stack 14 in order to estimate the temperature of the fuel cell stack 14 (i.e., of the fuel cell 84 itself).

A combustion chamber temperature sensor 144 detects the temperature in combustion chamber 18.

An exhaust gas chamber temperature sensor 146 detects the temperature of exhaust gases in the exhaust gas chamber 78.

A reformer temperature sensor 148 detects the temperature of the reformer 20 and calculates the reformer 20 temperature from the intake and exit temperatures on the reformer 20.

If the solid oxide fuel cell (SOFC) device is placed outdoors, the outside temperature sensor 150 detects the temperature of the outside atmosphere. Sensors to detect outside atmospheric humidity and the like may also be provided.

As shown in FIG. 3, ignition sensors 152 are provided in several locations near the top end portion of the fuel cell assembly 12, and function to detect the temperature around the top end portion of the fuel cell assembly 12 when the ignition device 83 is ignited, and to determine the ignition state based on the temperature.

Signals from these various sensors are sent to the control unit 110; the control unit 110 sends control signals to the water flow rate regulator unit 28, the fuel flow rate regulator unit 38, the reforming air flow rate regulator unit 44, and the power generating air flow rate regulator unit 45 based on data from the sensors, and controls the flow rates in each of these units.

The control unit 110 sends control signals to the inverter 54 to control the supplied electrical power.

Next, referring to FIG. 7, the operation of a solid oxide fuel cell (SOFC) device according to the present embodiment at the time of startup will be explained.

In order to warm up the fuel cell module 2, the operation starts in a no-load state, i.e., with the circuit which includes the fuel cell module 2 in an open state. At this point current does not flow in the circuit, therefore the fuel cell module 2 does not generate electricity.

First, reforming air is supplied from the reforming air flow rate regulator unit 44 to the reformer 20 on the fuel cell module 2. At the same time, power generating air is supplied from the generating air flow rate regulator unit 45 to an air heat exchanger 22 of the fuel cell module 2, and the power generating air reaches the generating chamber 10 and the combustion chamber 18.

Immediately thereafter, fuel gas is also supplied from the fuel flow rate regulator unit 38, and fuel gas into which reforming air is blended passes through the reformer 20, the fuel cell stack 14, and the fuel cell unit 16 to reach the combustion chamber 18.

Next, ignition is brought about by the ignition device 83, and fuel gas and air (reforming air and power generating air) supplied to the combustion chamber 18 is combusted. This combustion of fuel gas and air produces exhaust gas; the generating chamber 10 is warmed by the exhaust gas, and when the exhaust gas rises into the fuel cell module 2 sealed space 8, the fuel gas, which includes the reforming air in the reformer 20 is warm, as is the power generating air inside the air heat exchanger 22.

At this point, fuel gas into which the reforming air is blended is supplied to the reformer 20 by the fuel flow rate regulator unit 38 and the reforming air flow rate regulator unit 44, therefore the partial oxidation reforming reaction POX given by Expression (1) proceeds in the reformer 20. This partial oxidation reforming reaction POX is an exothermic reaction, and therefore has favorable starting characteristics. The fuel gas whose temperature has risen is supplied from the fuel gas supply line 64 to the bottom of the fuel cell stack 14, and by this means the fuel cell stack 14 is heated from the bottom, and the temperature of the combustion chamber 18 has risen by the combustion of the fuel gas and air, and the fuel cell stack 14 is therefore heated from the upper side such that the temperature of the fuel cell stack 14 can be raised in an essentially uniform manner in the vertical direction. Even though the partial oxidation reforming reaction POX is progressing, the ongoing combustion reaction between fuel gas and air is continued in the combustion chamber 18.

$$C_mH_n + xO_2 \rightarrow aCO_2 + bCO + cH_2 \quad (1)$$

When the reformer temperature sensor 148 detects that the reformer 20 has reached a predetermined temperature (e.g. 600° C.) after the start of the partial oxidation reforming reaction POX, a pre-blended gas of fuel gas, reforming air, and steam is applied to the reformer 20 by the water flow rate regulator unit 28, the fuel flow rate regulator unit 38, and the reforming air flow rate regulator unit 44. At this point an auto-thermal reforming reaction ATR, which makes use of both the aforementioned partial oxidation reforming reaction POX and the steam reforming reaction SR described below, proceeds in the reformer 20. This auto-thermal reforming reaction ATR can be internally thermally balanced, therefore the reaction proceeds in a thermally independent fashion inside the reformer 20. In other words, when there is a large amount of oxygen (air), heat emission by the partial oxidation reforming reaction POX dominates, and when there is a large amount of steam, the endothermic steam reforming reaction SR dominates. At this stage, the initial stage of startup has passed and some degree of elevated temperature has been achieved within the generating chamber 10, therefore even if the endothermic reaction is dominant, there will be no major drop in temperature. Also, the combustion reaction continues within the combustion chamber 18 even as the auto-thermal reforming reaction ATR proceeds.

When the reformer temperature sensor 146 detects that the reformer 20 has reached a predetermined temperature (e.g., 700° C.) following the start of the auto-thermal reforming reaction ATR shown as Expression (2), the supply of reforming air by the reforming air flow rate regulator unit 44 is stopped, and the supply of steam by the water flow rate regulator unit 28 is increased. By this means, a gas containing no air and only containing fuel gas and steam is supplied to the reformer 20, where the steam reforming reaction SR of Expression (3) proceeds.

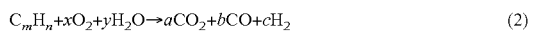

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction, therefore the reaction proceeds as a thermal balance is maintained with the heat of combustion from the combustion chamber 18. At this stage, the fuel cell module 2 is in the final stages of startup, therefore the temperature has risen to a sufficiently high level within the generating chamber 10 so that no major temperature drop is induced in the power generating chamber 10 even though an endothermic reaction is proceeding. Also, the combustion reaction continues to proceed in the combustion chamber 18 even as the steam reforming reaction SR is proceeding.

Thus, after the fuel cell module 2 has been ignited by the ignition device 83, the temperature inside the generating chamber 10 gradually rises as a result of the partial oxidation reforming reaction POX, the auto-thermal reforming reaction ATR, and the steam reforming reaction SR which proceed in that sequence. Next, when the temperature inside the generating chamber 10 and the temperature of the fuel cell 84 reach a predetermined generating temperature which is lower than the rated temperature at which the cell module 2 can be stably operated, the circuit which includes the fuel cell module 2 is closed, power generation by the fuel cell module 2 begins, and current then flows to the circuit. Generation of electricity by the fuel cell module 2 causes the fuel cell 84 to emit heat, such that the temperature of the fuel cell 84 rises. As a result, the rated temperature at which the fuel cell module 2 is operated becomes, for example, 600° C.-800° C.

Following this, fuel gas and air having respective flow rates greater than those consumed by the fuel cell 84 is applied in order to maintain the rated temperature and continue combustion inside the combustion chamber 18. Generation of electricity by the high reform-efficiency steam reforming reaction SR proceeds while electricity is being generated.

Next, referring to FIG. 8, the operation upon stopping the solid oxide fuel cell (SOFC) device according to the embodiment of the present invention will be explained.

Figure 8:
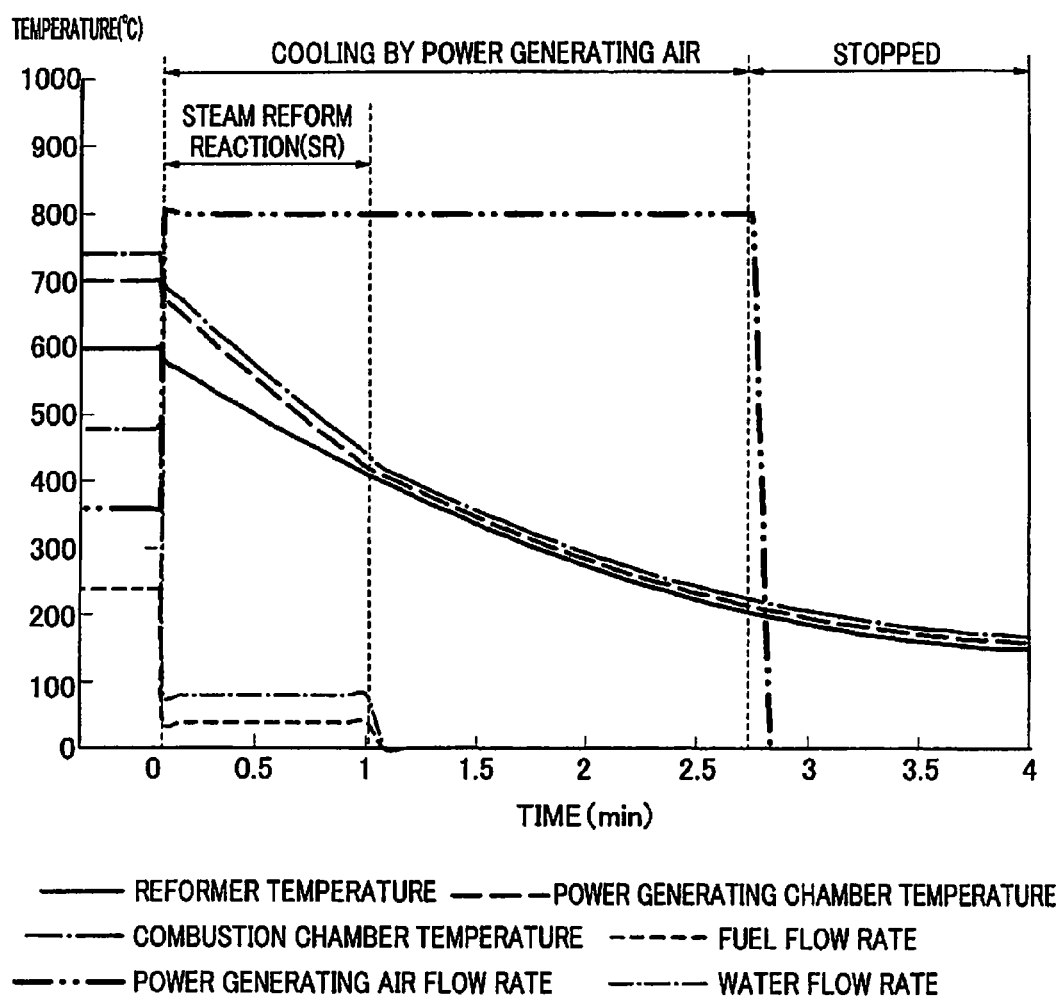
FIG. 8: A timing chart showing the operation at the time of shutdown of a solid oxide fuel cell device (SOFC) according to an embodiment of the present invention.

As shown in FIG. 8, when stopping the operation of the fuel cell module 2, the fuel flow rate regulator unit 38 and the water flow rate regulator unit 28 are first operated to reduce the flow rates of fuel gas and steam being supplied to the reformer 20.

When stopping the operation of the fuel cell module 2, the flow rate of power generating air supplied by the power generating air flow rate regulator unit 45 into the fuel cell module 2 is being increased at the same time that the flow rates of fuel gas and steam being supplied to the reformer 20 is being reduced; the fuel cell assembly 12 and the reformer 20 are air cooled to reduce their temperature. Thereafter, when the temperature of the generating chamber reaches a predetermined temperature, e.g. 400° C., supply of the fuel gas and steam to the reformer 20 is stopped, and the steam reforming reaction SR in the reformer 20 ends. Supply of the power generating air continues until the temperature in the reformer 20 reaches a predetermined temperature, e.g. 200° C.; when the predetermined temperature is reached, the supply of power generating air from the power generating air flow rate regulator unit 45 is stopped.

Thus in the embodiment of the present invention, the steam reforming reaction SR by the reformer 20 and cooling by power generating air are used in combination, therefore when the operation of the fuel cell module 2 is stopped, that operation can be stopped relatively quickly.

Next, referring to FIGS. 9 through 12, we discuss the effect of the load-following operation when generating electricity using a solid oxide fuel cell device 1 according to an embodiment of the present invention.

Figure 9:
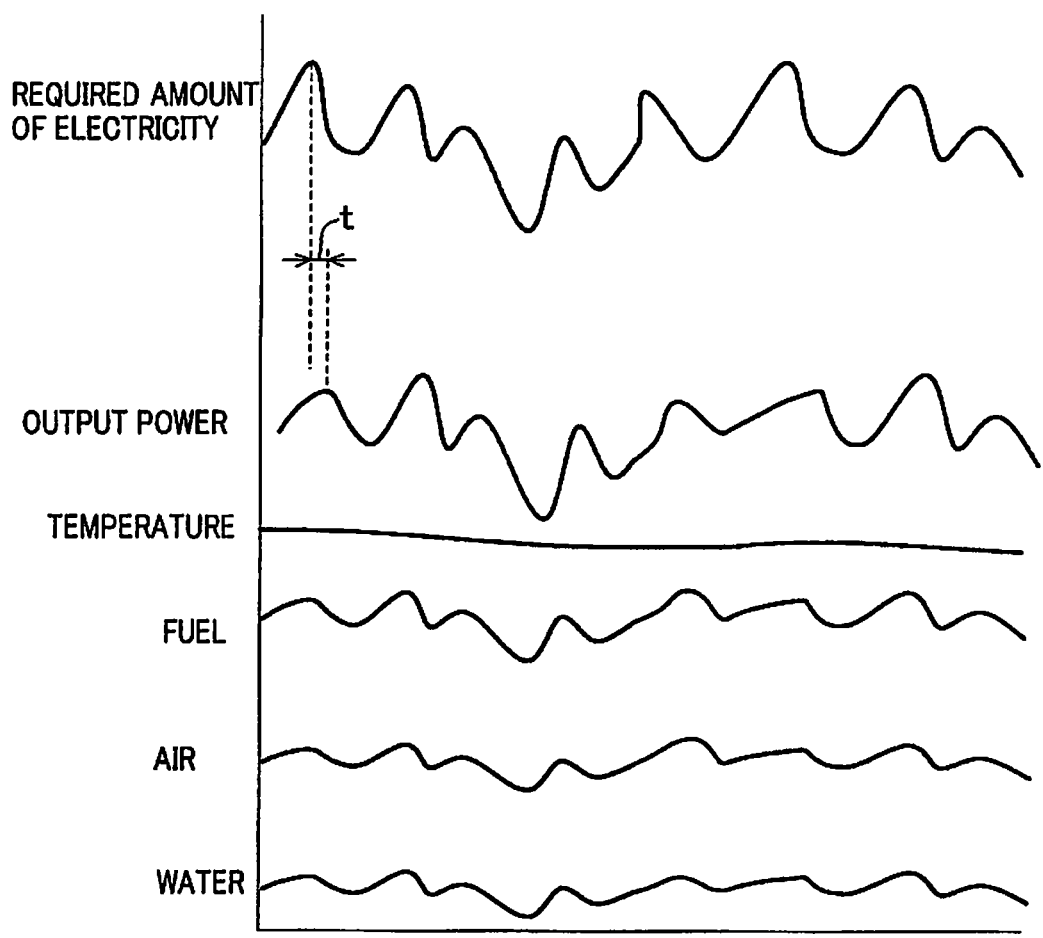
FIG. 9: A timing chart explaining the load-following operation in a solid oxide fuel cell device (SOFC) according to an embodiment of the present invention.

FIG. 9 is a timing chart explaining the load-following operation in a solid oxide fuel cell device of the embodiment. FIG. 10 is a graph showing an example of the relationship between the required amount of generated electricity input to the control section and the fuel supply flow rate needed to produce the required amount of generated electricity. FIG. 11 is a graph showing an example of the change over time in fuel supply flow rate relative to changes in the required amount of generated electricity. FIG. 12 is a data table showing an example of the relationship between the required amount of generated electricity and the fuel supply flow rate, generating air supply flow rate, and water supply flow rate needed to produce the required amount of generated electricity.

Figure 7:
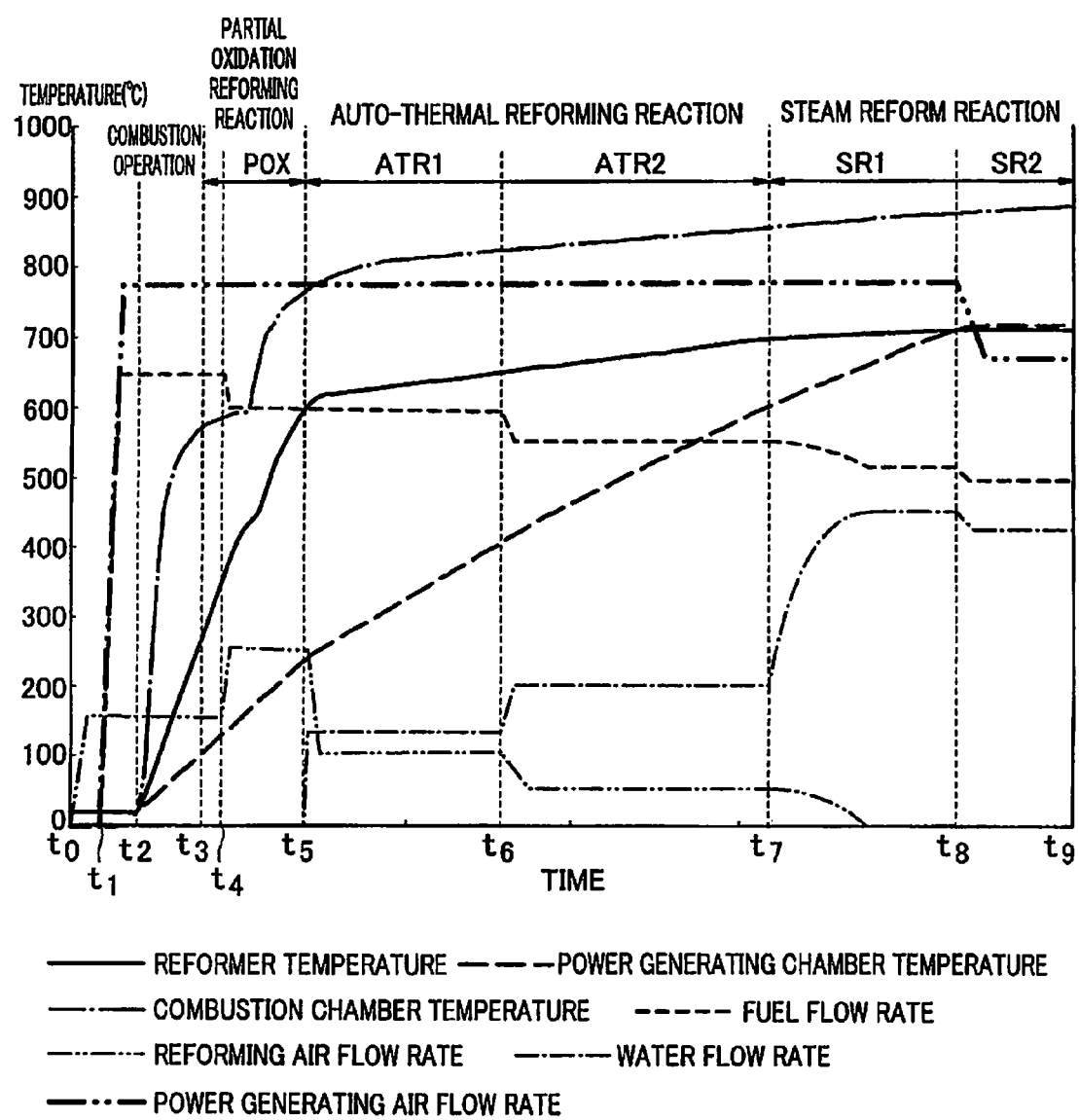
FIG. 7: A timing chart showing the operation upon startup of a solid oxide fuel cell device (SOFC) according to an embodiment of the present invention.

After the startup processing described in FIG. 7, the solid oxide fuel cell device 1 executes the load-following operation shown in FIG. 9 to obtain an output power corresponding to the required amount of generated electricity from the inverter 54 (FIG. 6). In other words, as shown in FIG. 6, the control section 110 serving as controller sends signals to the fuel flow regulator unit 38 serving as fuel supply device, the generating airflow regulator unit 45 serving as oxidant gas supply device, and the water flow regulator unit 28 serving as water supply device in response to the required amount of generated electricity from the inverter 54, thereby supplying the requisite flow rates of fuel, air, and water to the fuel cell module 2. As shown in FIG. 9, the output power of the solid oxide fuel cell device 1 thereby changes to follow the amount of generated electricity required from the inverter 54. Here the output power response relative to the required amount of generated electricity is delayed; the output power changes in delay due to the slowing of the change in fuel supply flow rate, etc., and output power-following is also delayed relative to the sudden change in required electrical generation, due to the major suppression of change in fuel supply flow rate. Note that the control section 110, the fuel flow regulator unit 38, the generating airflow regulator unit 45, and the water flow regulator unit 28 function respectively as a control means, a fuel supply means, an oxidant gas supply means, and a water supply means.

The control section 110 determines the fuel supply flow rate in accordance with the required amount of generated electricity from the inverter 54 using the graph illustrating an example in FIG. 10, and controls the fuel flow regulator unit 38 so that the determined flow rate of fuel is supplied to the reformer 20 in the fuel cell module 2. The control section 110 determines a fuel supply flow rate relative to the required electrical generation according to curve F0 in FIG. 10. As shown in FIG. 10, the fuel supply flow rate is determined so as to increase monotonically with an increase in the required amount of generated electricity, however the fuel supply flow rate is essentially a fixed value at or below the required generated electricity amount of approximately 200 W.

When the required amount of generated electricity is changed, degradation of the fuel cell module 2 may be hastened due to the sudden change in fuel cell unit temperature if the fuel supply flow rate is suddenly changed, therefore as shown in FIG. 11, the fuel supply flow rate is gradually increased or gradually decreased in order to achieve smooth changes. As shown in FIG. 11, the rate of change in the fuel supply flow rate when fuel is increased is set to be smaller than the rate of change in the fuel supply flow rate when fuel is reduced. In other words, if the change is smoothened and the delay is made large relative to a reduction in the fuel supply flow rate, fuel is unnecessarily consumed, therefore the rate of change is set to be larger for a reduction than for an increase. FIG. 11 is a graph showing an example of the change in fuel supply flow rate over time when the required amount of generated electricity changes in a step fashion from 500 W to 700 W. As shown in FIG. 11, if the required amount of generated electricity is suddenly changed from 500 W to 700 W at time t10, the required fuel supply flow rate also suddenly changes, from a supply flow rate corresponding to a 500 W electrical power output to a supply flow rate corresponding to 700 W. However, the control section 110 controls the fuel flow regulator unit 38 to gradually increase the fuel supply flow rate as shown by the imaginary line F10 in FIG. 11, so as to prevent a sudden increase in the fuel supply flow rate.

Similarly, at time t11, when the required amount of generated electricity changes from 700 W to 500 W, the control section 110 gradually reduces the fuel supply flow rate following imaginary line F10 in FIG. 11 to avoid sudden reduction in the fuel supply flow rate. Note that the rate of change in the fuel supply flow rate is set to be more gradual for an increase in the supply flow rate than a reduction in the supply flow rate. As explained above, the fuel reduction side does not act in the direction of increasing the cell temperature, therefore optimization is performed to reduce wasteful fuel consumption while preventing excess temperature reduction caused by the reduction in fuel, taking note of the low sensitivity to cell degradation.

Furthermore, while FIGS. 10 and 11 related to fuel supply flow rate, similar changes are made relative to the generating air supply flow rate and water supply flow rate.

In the present embodiment, as shown in FIG. 12, the fuel supply flow rate corresponding to a generation requirement of 500 W is 2.3 L/min, and the fuel supply flow rate corresponding to a generation requirement of 700 W is 2.8 L/min. When the generation requirement increases from 500 W to 700 W, the control section 110 increases the fuel supply flow rate from 2.3 L/min to 2.8 L/min over a 4 minute interval. Therefore the average rate of change versus time in the fuel supply flow rate during this interval is 0.125 L/min/min. When the electrical generation requirement decreases from 700 W to 500 W, the control section 110 decreases the fuel supply flow rate from 2.8 L/min to 2.3 L/min over a 0.5 minute interval, so the average rate of change in the fuel supply flow rate is 1.0 L/min/min. In the present embodiment the control section 110 changes the fuel supply flow rate in response to various changes in the electrical generation requirement, but the rate of change in the fuel supply flow rate in response to changes in the electrical generation requirement is set at a value between 0.1 and 1.5 L/min/min.

Next, referring to FIG. 13 and again to FIG. 7, we discuss details of startup processing for the solid oxide fuel cell device 1 of this embodiment of the present invention.

FIG. 13 is an operation table showing the solid oxide fuel cell device 1 startup processing procedure.

When the solid oxide fuel cell device 1 is started up at time t0 in FIG. 7, the control section 110 sends a signal to the reforming airflow regulator unit 44 serving as reforming oxidant gas supply device and to the generating airflow regulator unit 45 serving as generating oxidant gas supply device, thereby starting those devices and supplying reforming air and generating air to the fuel cell module 2. In the present embodiment, the reforming air supply flow rate is set at 10 L/min and the generating air supply flow rate is set at 100 L/min when supply is started at time t0 (FIG. 13). Also, the reforming airflow regulator unit 44 functions as reforming oxidant gas supply means.

Next, at time t1, the control section 110 sends a signal to the fuel flow regulator unit 38 serving as fuel supply device, thereby starting the supply of fuel to the reformer 20. Fuel and reforming air thereby fed into the reformer 20 are thus fed into each of the fuel cell units 16 via the reformer 20, the fuel gas supply pipe 64, and the manifold 66. Fuel and reforming air fed into each of the fuel cell units 16 flows out of the top ends of each of the fuel cell unit 16 fuel gas flow paths 98. Note that in the present embodiment, the fuel supply flow rate is set at 6 L/min when supply is started at time t1 (the "combustion operation" state in FIG. 13).

Moreover, at time t2, the control section 110 sends a signal to the ignition device 83 and ignites fuel flowing out of the fuel cell unit 16. Fuel is thus combusted in the combustion chamber 18, so that the reformer 20 disposed thereabove is heated, and the temperature of the combustion chamber 18, the electrical generation chamber 10, and the fuel cell stack 14 disposed in the chamber 10 also rises (times t2-t3 in FIG. 7). When the temperature of the reformer 20 reaches about 300° C. as a result of this heating of the reformer 20, a partial oxidation reform reaction (POX) occurs within the reformer 20 (time t3 in FIG. 7). Because the partial oxidation reform reaction is an exothermic reaction, the reformer 20 is heated by the heat of reaction arising from the occurrence of the partial oxidation reform reaction.

When the temperature further rises and the temperature of the reformer 20 reaches 350° C., the control section 110 sends a signal to the fuel flow regulator unit 38 reducing the fuel supply flow rate, and sends a signal to the reforming airflow regulator unit 44 increasing the reforming air supply flow rate (time t4 in FIG. 7). As a result, the fuel supply flow rate is changed to 5 L/min, and the reforming air supply flow rate is changed to 18 L/min (the "POX2" state in FIG. 13). These supply flow rates are appropriate supply flow rates for generating a partial oxidation reaction. In other words, in the initial temperature region in which a partial oxidation reaction begins to occur, a state is formed in which fuel is reliably ignited by increasing the proportion of fuel supplied, and ignition is stabilized by maintaining that supply flow rate (the "POX1" state in FIG. 13). Moreover, after stable ignition and a rise in temperature, fuel waste is suppressed by using a fuel supply flow rate sufficient to produce a partial oxidation reaction (the "POX2" state in FIG. 13).

Thus in the present embodiment the control section 110 controls the fuel flow regulator unit 38 so that the POX changes in two stages. The transition from the first stage POX (the "POX1" state) to the second stage POX (the "POX2" state) is here performed in approximately 4 minutes, and the fuel supply flow rate is reduced from 6 L/min to 5 L/min. Therefore the average rate of change in the fuel supply flow rate versus time during this interval is 0.25 L/min/min.

Next, at time t5 in FIG. 7, when the reformer 20 temperature reaches 600° C. or above and the fuel cell unit 16 temperature reaches 250° C. or above, the control section 110 sends a signal to the reforming airflow regulator unit 44 to reduce the reforming air supply flow rate, and sends a signal to the water flow regulator unit 28 serving as water supply device to start the supply of water.

The control section 110 reduces the reforming air supply flow rate from 18 L/min to 8 L/min over a period of 4 minutes (the "ATR1" state in FIG. 13). Therefore the average rate of change in the reforming air supply flow rate versus time during this interval is 2.5 L/min/min. The control section 110 increases the water supply flow rate from 0 cc/min to 2 cc/min over a period of 4 minutes (the "ATR1" state in FIG. 13). Therefore the average rate of change in the water supply flow rate versus time during this interval is 0.5 cc/min/min. Note that at time t5 the fuel supply flow rate is not changed. The steam reforming reaction is also induced in the reformer 20 by the introduction of water (steam) into the reformer 20. That is, auto-thermal reforming (ATR), in which the partial oxidation reaction and the steam reforming reaction are mixed, is induced in the "ATR1" state of FIG. 13.

In the present embodiment, the temperature of the fuel cell unit 16 is measured by a generating chamber temperature sensor 142 serving as a temperature detection means disposed in the electrical generating chamber 10. The temperature inside the generating chamber and the temperature of the fuel cell units are not, precisely speaking, identical, but the temperature detected by the generating chamber temperature sensor reflects the temperature of the fuel cell unit, and the temperature of the fuel cell unit can be grasped by the temperature of the generating chamber temperature sensor inside the generating chamber. Note that in this Specification, "fuel cell unit temperature" means a temperature measured by any selected sensor indicating a value reflecting the temperature of the fuel cell unit.

Moreover, at time t6 in FIG. 7, when the temperature of the reformer 20 reaches 600° C. or above and the temperature of the fuel cell unit 16 reaches 400° C. or above, the control section 110 sends a signal to the fuel flow regulator unit 38 and reduces the fuel supply flow rate. The control section 110 also sends a signal to the reforming airflow regulator unit 44 reducing the reforming air supply flow rate, and sends a signal to the water flow regulator unit 28 increasing the water supply flow rate. By this means, the fuel supply flow rate is changed to 4 L/min, the reforming air supply flow rate is changed to 4 L/min, and the water supply flow rate is changed to 3 cc/min (the "ATR2" state in FIG. 13). Reducing the reforming air supply flow rate and increasing the water supply flow rate results in a reduction in the proportion of the partial oxidation reaction and an increase in the proportion of the steam reforming reaction in the reformer 20.

Thus in the present embodiment the control section 110 controls the fuel flow regulator unit 38 so that the ATR changes and occurs in two stages. Here the transition from the first stage ATR (the "ATR1" state) to the second stage ATR (the "ATR2" state) occurs over approximately 4 minutes, and the fuel supply flow rate is reduced from 5 L/min to 4 L/min. Therefore the average rate of change in the fuel supply flow rate versus time in this interval is 0.25 L/min/min. The reforming air supply flow rate is reduced from 8 L/min to 4 L/min. Therefore the average rate of change in the reforming air supply flow rate versus time in this interval is 1.0 L/min/min. In addition, the water supply flow rate is increased from 2 cc/min to 3 cc/min, and the average rate of change in the water supply flow rate versus time in this interval is 0.25 cc/min/min.

Next, at time t7 in FIG. 7, when the temperature of the reformer 20 reaches 650° C. or above and the temperature of the fuel cell unit 16 reaches 600° C. or above, the control section 110 sends a signal to the reforming airflow regulator unit 44, stopping the supply of reforming air. The control section 110 also sends a signal to the fuel flow regulator unit 38 reducing the fuel supply flow rate, and sends a signal to the water flow regulator unit 28, increasing the water supply flow rate. The flow rate of fuel supplied is thus changed to 3 L/min, and the flow rate of water supplied is changed to 8 cc/min (the "SR1" state in FIG. 13). Because the supply of reforming air is stopped, the partial oxidation reaction ceases to occur inside the reformer 20, and the SR, in which only the steam reforming reaction takes place, commences.

The transition from this second stage ATR (the "ATR2" state) to the SR ("SR1" state) is carried out over an extremely long time period of approximately 25 minutes, and the fuel supply flow rate is reduced from 4 L/min to 3 L/min. Therefore the average rate of change in the fuel supply flow rate from the second stage ATR to the completion of the transition to the SR is 0.04 L/min/min. In addition, the rate of change in the fuel supply flow rate is at this point set to be small at the beginning period of the transition, gradually growing as the transition advances; i.e. so that the slope of the curve showing the fuel supply flow rate in the FIG. 7 timing chart is set small at the beginning period of the transition from the ATR to the SR, with the absolute value gradually growing toward the ending period of the transition.

In the transition from the second stage ATR to the SR, the reforming air supply flow rate is reduced from 4 L/min to 0 L/min (supply stopped), and the average rate of change in the flow rate of reforming air supplied during this period versus time is 0.16 L/min/min. The rate of change in the reforming air supply flow rate is at this point set to be small at the beginning period of the transition, gradually growing as the transition advances; i.e. so that the slope of the curve showing the reforming air supply flow rate in the FIG. 7 timing chart is set small at the beginning period of the transition from the ATR to the SR, with the absolute value gradually growing toward the ending period of the transition.

Furthermore, the water supply flow rate is increased from 3 cc/min to 8 cc/min, and the average rate of change in the water supply flow rate during this interval is 0.2 cc/min/min. The rate of change in the water supply flow rate is at this point set in the opposite manner to the fuel and reforming air, so as to be large at the beginning period of the transition, gradually decreasing as the transition advances, i.e. so that the slope of the curve showing the water supply flow rate in the FIG. 7 timing chart is set large at the beginning period of the transition from the ATR to the SR, with the absolute value gradually decreasing toward the ending period of the transition. During this transition interval from ATR to SR, the supply of reforming air gradually decreases and is stopped, so the fuel quantity reformed by the partial oxidation reaction in the reformer 20 also decreases. Of the fuel supplied into the reformer, the entire amount of the remaining fuel is necessary to be reformed by the steam reforming reaction without being reformed by the partial oxidation reaction. In the present embodiment, the water flow regulator unit 28 is controlled so that a sufficient quantity of water for performing the steam reforming reaction on all remaining fuel without reforming by the partial oxidation reaction is constantly supplied by setting a high rate of change for the increase in the water supply flow rate at the beginning period of the transition from the ATR to the SR. This enables reliable prevention of carbon deposition and other problems when there is insufficient steam in the reformer 20.

The average rate of change versus time in the fuel supply flow rate, the reforming air supply flow rate, and the water supply flow rate during this transition from the ATR to the SR is set to have the smallest absolute value among the rates of change of each of the supply flow rates changed during the transition from the "POX1" state to the "POX2" state, the transition from the "POX2" state to the "ATR1" state, the transition from the "ATR1" state to the "ATR2" state, and the transition from the "SR1" state to the "SR2" state, the last of which is discussed below. In addition, the average rate of change versus time in the fuel supply flow rate, the reforming air supply flow rate, and the water supply flow rate during the transition from the second stage ATR to the SR is set to have a smaller absolute value compared to the rate of change in each of the supply flow rates changed during the load-following operation after startup of electrical generation.

Furthermore, at time t8 in FIG. 7, when the temperature of the reformer 20 reaches 650° C. or above, and the temperature of the fuel cell unit 16 reaches 700° C. or above, the control section 110 sends a signal to the fuel flow regulator unit 38 reducing the fuel supply flow rate, and sends a signal to the water flow regulator unit 28 reducing the supply flow rate of water. The control section 110 sends a signal to the generating airflow regulator 45, reducing the generating air supply flow rate. The fuel supply flow rate is thus changed to an electrical generation standby fuel supply flow rate of 2.3 L/min, the water supply flow rate is changed to 6.3 cc/min, and the generating air supply flow rate is changed to 80 L/min (the "SR2" state in FIG. 13).

Thus in the present embodiment the control section 110 controls the fuel flow regulator unit 38 so that the SR is changed and occurs in two stages. The transition from the first stage SR (the "SR1" state) to the second stage SR (the "SR2" state) is carried out over approximately 4 minutes, and the fuel supply flow rate is reduced from 3.0 L/min to 2.3 L/min. Therefore the average rate of change in the fuel supply flow rate versus time during this interval is 0.175 L/min/min. The control section 110 reduces the water supply flow rate from 8.0 cc/min to 6.3 cc/min; during this period the average rate of change versus time in the water supply flow rate is 0.425 cc/min/min.

After maintaining supply flow rate in an "SR2" state over a predetermined transition time to electrical generation, the control section 110 causes power to be output from the fuel cell module 2 to the inverter 54, starting electrical generation (time t9 in FIG. 7). The fuel supply flow rate, generating air supply flow rate, and water supply flow rate after startup of electrical generation are determined and supplied based on FIGS. 10 and 11 in response to required power, and a load-following operation is implemented.

Note that in the present embodiment the transition time to electrical generation is set at 4 minutes. In the example shown in FIG. 7, after transitioning to "SR1" state, the temperature of the fuel cell unit 16 promptly rises to the temperature at which electrical generation is possible, but when a predetermined initial SR continuation time has elapsed after transition to the "SR1" state, the control section 110 causes the operation to transition to the "SR2" state even if the temperature at which electrical generation is possible has not been reached. In other words, the control section 110 maintains the fuel supply flow rate in the "SR1" state until the fuel cell unit 16 rises to the temperature at which electrical generation is possible, or until the initial SR continuation time has elapsed. In the present embodiment the initial SR continuation time is set at 30 minutes. Also, the control section 110 starts electrical generation when a predetermined transition time to electrical generation has elapsed following transition to the "SR2" state, and the temperature of the fuel cell unit 16 has reached or exceeded the temperature at which electrical generation is possible.

In the solid oxide fuel cell device of the present embodiment of the invention, the rate of change in the fuel supply flow rate is arranged to be smallest at the time of transition from the "ATR2" state to the "SR1" state, thus enabling the prevention of sudden temperature drops in the transition to the "SR1" state, which changes such that only the endothermic reaction is occurring. This enables a stable increase in the temperature of the solid oxide fuel cell unit in the startup state, so that electrical generation can be smoothly started. The rate of change in the fuel supply flow rate in the startup procedure is set to be smallest at the time of transition from the "ATR2" state to the "SR1" state, and larger than that rate during other changes in the fuel supply flow rate, enabling the time required from startup until the start of electrical generation to be shortened, while preventing the sudden temperature reductions.

Furthermore, using the solid oxide fuel cell device of the present embodiment, the rate of change in the fuel supply flow rate during the transition from the "ATR2" state to the "SR1" state is arranged to be smaller than the rate of change in the fuel supply flow rate when causing the output power to change, therefore required power can be rapidly followed while enabling a stable temperature rise in the solid oxide fuel cell unit in the startup state.

In the solid oxide fuel cell device of the present embodiment, the rate of change in the flow rate of reforming air supplied versus time during the transition from the "ATR2" state to the "SR1" state is set to be the smallest among the rates of change when changing the reforming air supply flow rate during the startup procedure, and the rate of change versus time in the water supply flow rate when transitioning from the "ATR2" state to the "SR1" state is set to be the smallest among the rates of change when changing the water supply flow rate during the startup procedure, thereby preventing sudden changes of the reaction in the reformer at the time of transition from the "ATR2" state to the "SR1" state. The temperature of the solid oxide fuel cell unit can thus be stably increased, and electrical generation can be smoothly started.

Furthermore, in the solid oxide fuel cell device of the present embodiment the rate of change in the fuel supply flow rate versus time when transitioning from the "ATR2" state to the "SR1" state is set to be larger at the ending period of the transition than at the beginning period of the transition, enabling the transition interval from the "ATR2" state to the "SR1" state to be shortened and preventing sudden temperature changes.

We have described above preferred embodiments of the present invention, however various changes to the above-described embodiments may be added. In particular, in the above-described embodiments the solid oxide fuel cell device was constituted to be capable of varying electrical power in response to the electrical generation requirement, but the present invention may also be applied to fuel cell device outputting a constant fixed electrical power.

What is claimed is:

1. A solid oxide fuel cell system for generating electricity by reacting fuel with an electricity generating oxidation gas, comprising:
   a fuel cell module comprising multiple solid oxide fuel cell units which is thermally prepared for generation of electricity through a series of startup operations comprising an auto-thermal reforming (ATR) reaction operation and a steam reforming (SR) reaction operation performed after the ATR operation;
   a reformer that supplies reformed fuel to the solid oxide fuel cell units;
   a fuel supply device that supplies fuel to the reformer for reformation of the fuel;
   a reforming oxidation gas supply device that supplies reforming oxidation gas to the reformer;
   a water supply device that supplies water to the reformer;
   a generating oxidant gas supply device that supplies the electricity generating oxidation gas to the solid oxide fuel cell units; and
   a controller programmed to control the fuel supply device to reduce a rate of fuel supply to the reformer in a step-wise manner during transitions between adjacent startup operations such that a change in the fuel supply rate which takes place during a transition from the ATR operation to the SR operation is smallest, compared to changes in the fuel supply rate which take place during the other transitions between adjacent startup operations.

2. The solid oxide fuel cell system of claim 1, wherein the controller is programmed to control the reforming oxidation gas supply device to change a supply rate of the reforming oxidation gas in a stepwise manner during the startup operations so that a change in the supply rate of the reforming oxidation gas which takes place during the transition from the ATR operation to the SR operation is smallest, compared to changes of the supply rate of the reforming oxidation gas which take place during the other transitions between adjacent startup operations, and
   the controller is further programmed to control the water supply device to change a supply rate of water in a stepwise manner during the startup operations so that a change in the water supply rate which takes place during the transition from the ATR operation to the SR operation is smallest, compared to changes of the water supply rate which take place during the other transitions between adjacent startup operations.

3. The solid oxide fuel cell system of claim 1, wherein the controller is programmed to control the fuel supply device so that a change in the fuel supply rate which takes place during the transition from the ATR operation to the SR operation is larger in an ending period of the transition than in a beginning period of the transition.

4. The solid oxide fuel cell system of claim 1, wherein the controller is programmed to control the reforming oxidant gas supply device to terminate supply of the reforming oxidation gas over the transition from the ATR operation to the SR operation such that a change of supply rate of the reforming oxidation gas is greater in an ending period of the transition than in a beginning period of the transition.

5. The solid oxide fuel cell system of claim 3, wherein the controller is programmed to control the reforming oxidation gas supply device to terminate supply of the reforming oxidation gas over the transition from the ATR operation to the SR operation such that a change of supply rate of the reforming oxidation gas is greater in an ending period of the transition than in a beginning period of the transition.

6. The solid oxide fuel cell system of claim 5, wherein the controller is programmed to control the water supply device to supply a sufficient quantity of water during a transition from the ATR operation to the SR operation in order to reform all fuel by a steam reforming reaction, which is left unreformed by a partial oxidation reaction.

7. The solid oxide fuel cell system of claim 2, wherein the controller is programmed to control the water supply device so that a change in the water supply rate which takes place during the transition from the ATR operation to the SR operation is greater in a beginning period of the transition than in an ending period of the transition.

* * * * *